United States Patent
Werz et al.

[11] 3,730,617
[45] May 1, 1973

[54] MOTION PICTURE CAMERA FOR USE IN DAYLIGHT AND ARTIFICIAL LIGHT

[75] Inventors: Siegfried Werz, Munich; Johann Zanner, Unterhaching, both of Germany

[73] Assignee: AGFA-Gevaert Aktiengesellschaft, Leverkusen, Germany

[22] Filed: Aug. 25, 1971

[21] Appl. No.: 174,639

[30] Foreign Application Priority Data

Aug. 27, 1970 Germany ................. G 70 31 983.4

[52] U.S. Cl. ..................... 352/244, 95/11, 352/45
[51] Int. Cl. ........................................... G03b 11/00
[58] Field of Search ............. 352/45, 244; 95/11, 95/11.5

[56] References Cited

UNITED STATES PATENTS 3,314,349   4/1967   Koeber ........................ 352/45 X
3,421,422   1/1969   Winkler ........................ 95/11 R

FOREIGN PATENTS OR APPLICATIONS 255,906   7/1967   Austria ........................ 352/45

Primary Examiner—Samuel S. Matthews
Assistant Examiner—Monroe H. Hayes
Attorney—Michael S. Striker

[57] ABSTRACT

A motion picture camera with a conversion filter which is automatically moved out of registry with the picture taking lens in response to attachment of a source of artificial light. A knob which is connected with the mechanism that moves the filter in response to attachment of a light source to the housing of the camera can be actuated by hand to return the filter into registry with the lens while the light source remains attached to the housing to thus enable the user to make one or more exposures without artificial illumination of the subject while the source remains attached to the housing. The knob can also return the filter to a position out of registry with the lens while the light source remains attached to the housing.

13 Claims, 1 Drawing Figure

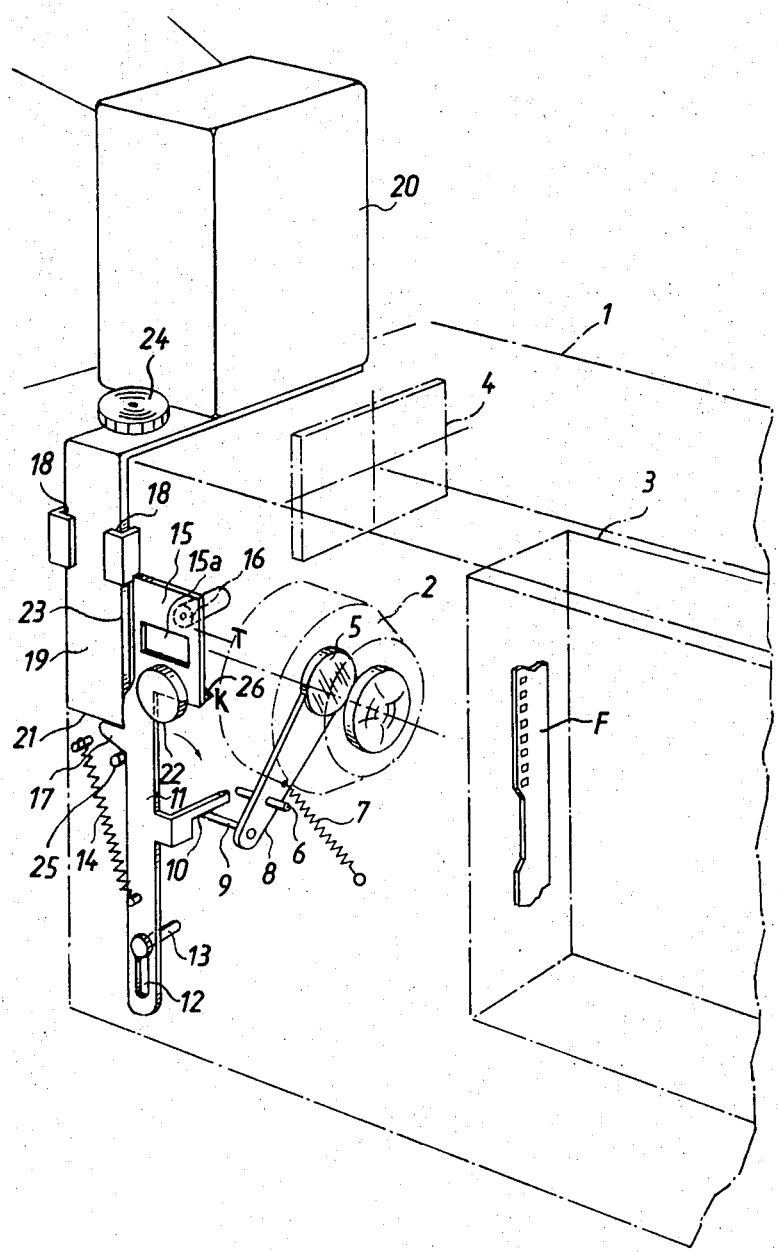

MOTION PICTURE CAMERA FOR USE IN DAYLIGHT AND ARTIFICIAL LIGHT

BACKGROUND OF THE INVENTION

The present invention relates to photographic apparatus in general, and more particularly to improvements in motion picture cameras, especially in motion picture cameras which can use 8-millimeter film and can make exposures in daylight or with artificial illumination of the subject.

It is already known to provide a motion picture camera with a conversion filter which is moved into registry with the picture taking lens when the camera is to make exposures in daylight and which must be moved out of registry with the lens for the making of exposures with artificial illumination of the subject. It is further known to provide the source of artificial light with a portion or device which automatically moves the filter out of register with the lens in response to proper attachment of the light source to the housing of the motion picture camera.

A drawback of presently known motion picture cameras with conversion filters which are automatically moved to a predetermined position in response to attachment of a light source is that the light source must be detached whenever the user wishes to make one or more exposures without artificial illumination of the subject by the attached light source. Thus, the light source must be detached even if the user intends to make a single daylight exposure following one or more exposures with artificial light and preceding one or more exposures with artificial illumination of the subject. This is a time-consuming procedure and the user must find room for storage or deposition of the light source whenever the latter is detached from the housing of the camera, even for a short interval of time.

SUMMARY OF THE INVENTION

An object of the invention is to provide a motion picture camera which employs a conversion filter and means for automatically moving the conversion filter in response to attachment of a source of artificial light with novel and improved means for permitting the making of one or more exposures in daylight or with a discrete second light source while the light source which normally causes movements of the filter remains attached to the housing of the camera.

Another object of the invention is to provide a novel and improved motion transmitting mechanism which can be actuated by a light source and serves to effect movements of the conversion filter into and from registry with the picture taking lens.

A further object of the invention is to provide a motion picture camera which employs a conversion filter with novel and improved means for permitting manually induced displacements of the filter when the light source is attached to or detached from the housing of the camera.

An additional object of the invention is to provide a motion picture camera which employs a conversion filter with compact, simple, rugged, relatively inexpensive and reliable means for moving the conversion filter in response to as well as independently of insertion or detachment of a light source.

The invention is embodied in a motion picture camera for use in daylight and with artificial illumination of the subject, particularly in a camera for use with 8-millimeter film. The camera comprises a housing or body, a picture taking lens mounted in the housing, conversion filter means mounted in the housing for movement between a first position of registry and a second position out of register with the lens, a source of artificial light having a portion which is movable with reference to the housing to and from an operative position, motion transmitting means which serves to move the filter means from one of its positions to the other position (normally from registry to a position out of register with the lens) in response to movement of the portion of the light source to its operative position, and overriding means which is actuatable to effect movements of the filter means from the other position to the one position and (if desired or necessary) back to the other position in the operative position of the portion of the light source. The overriding means is preferably designed to move the filter means through the intermediary of the motion transmitting means and the latter preferably includes a device for automatically returning the filter means to the one position in response to movement of the portion of the light source from its operative position.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary diagrammatic perspective view of a motion picture camera which embodies the invention, the housing of the camera and a film-containing cassette being indicated by phantom lines.

DESCRIPTION OF THE PREFERRED EMBODIMENTS

The drawing illustrates a motion picture camera for use with 8-millimeter motion picture film F which is stored in cassettes or magazines 3. The illustrated cassette 3 is removably installed in a housing or body 1 which has a front wall supporting a picture taking lens 2. Successive frames of the film F are moved into registry with the lens 2 by a conventional film transporting mechanism which preferably employs a claw pulldown, not shown.

The camera is intended for use in daylight and in artificial light. In order to avoid the necessity for changing the film whenever the user wishes to make one or more exposures with artificial illumination of the subject subsequent to making of one or more exposures in daylight, or vice versa, the camera is provided with a customary conversion filter 5 which is held in a first position of registry with the lens 2 when the camera is ready to make exposures in daylight but must be moved from such position to another position (out of registry with the lens 2) when the camera is to make one or more exposures in artificial light. The reference character 4 denotes the window of a view finder which is mounted in the housing 1.

The drawing further shows a source 20 of artificial light. This source is assumed to be an electronic flash unit which has a downwardly extending portion or foot 19 shown in its operative position. In such operative position, the foot 19 is received between two guide rails 18 which are mounted in or on the housing 1 and define for the foot 19 an elongated vertical path in which the foot moves downwardly during movement to the illustrated operative position. A screw 24 or the like can be provided to releasably secure the foot 19 to the housing 1.

The motion picture camera further comprises a motion transmitting mechanism which serves to automatically move the conversion filter 5 to the illustrated position (namely, out of register with the lens 2) in response to movement of the foot 19 to its operative position and to automatically move the filter to the first position (of registry with the lens 2) when the foot 19 is moved from the operative position by being withdrawn upwardly and out of the path defined by the guide rails 18. The motion transmitting mechanism comprises a motion transmitting member or slide 11 which is mounted in the housing 1 and has a projecting lobe or follower 17 normally extending into the path of movement of the foot 19 while the latter is being moved to the illustrated operative position. The lower end portion of the member or slide 11 has an elongated slot 12 for a pivot or stop 13 which serves to guide the member 11 and to arrest it in and/or close to a predetermined position (in which the filter 5 is in registry with the lens 2) when the foot 19 is withdrawn from the guide rails 18. The member 11 is invariably biased to such predetermined position by a helical spring 14 which exerts upon the member 11 a first force acting in the longitudinal direction of the path defined by the guide rails 18 (upwardly, as viewed in the drawing) and a second force which acts in a direction that is at least substantially normal to the longitudinal direction of the path for the foot 19. In the drawing, the first force acts upwardly and the second force acts in a direction from the right to the left and tends to pivot the member 11 in a counterclockwise direction about the axis defined by the pivot or stop 13.

The member 11 is provided with a transversely extending projection or arm 10 having an edge face which is permanently tracked by a follower pin 9 provided on a carrier 8 for the filter 5. The carrier 8 is a two-armed lever which is fulcrumed in the housing 1, as at 6, and is biased in a clockwise direction, as viewed in the drawing, by a helical spring 7. The upper arm of the carrier 8 supports the filter 5 and its lower arm supports the follower pin 9.

The upper end portion 15 of the member 11 forms a mask which resembles a plate and is provided with an opening 15a. This opening 15a registers with and affords access to a socket 16, which is mounted in the housing 1, only when the member 11 is free to assume or is held close to the aforementioned predetermined position under the action of the biasing means 14. The socket 16 contains one or more terminals (not specifically shown) which can be engaged by complementary terminal or terminals (not shown) of a discrete light source which can be used with the camera at least when the foot 19 is removed from the path defined by the guide rails 18 so that the member 11 is free to reassume its predetermined or starting position in which the filter 5 is in registry with the lens 2 and the camera is ready to make exposures in daylight.

In order to enable the user to make exposures in daylight without removing the foot 19 of the light source 20 from the space defined by the guide rails 18, the camera is provided with overriding means 22 which can be actuated by hand to move the motion transmitting member 11 to or close to its predetermined or starting position while the foot 19 remains in the illustrated operative position, as well as to return the member 11 to the illustrated additional position in which the filter 5 is out of register with the lens 2. The overriding means 22 is a knob which is accessible from without the housing 1 and can be grasped by hand to pivot the member 11 in a clockwise direction so as to move the follower 17 away from engagement with the front (lower) end face 21 of the foot 19. The spring 14 is then free to contract and causes the tip of the follower 17 to slide along a substantially vertical guide face 23 of the foot 19 so that the member 11 can assume a position close to its predetermined position and is automatically arrested in such position by the stop 13. The spring 7 is free to pivot the carrier 8 in a clockwise direction while the member 11 moves upwardly (i.e., while the tip of the follower 17 slides along the guide face 23 which is parallel with the longitudinal direction of the path defined by the guide rails 18) so that the filter 5 is moved into register with the lens 2 and the camera is ready to make one or more exposures in daylight and/or with a source of artificial light which can be connected to the camera because the socket 16 is accessible by way of the opening 15a in the upper end portion 15 of the member 11. The portion 15 has an index 26 which is movable into registry with symbols K and T applied to the external surface of the housing 1 or to a scale which is attached to the housing. When the index 26 registers with the symbol K, the camera is ready to make exposures with artificial illumination of the subject, such illumination being effected by the light source 20. When the index 26 registers with the symbol T, the camera is ready to make exposures in daylight because the member 11 then dwells in or close to its predetermined position and the filter 5 is in register with the lens 2.

It is clear that, when the camera which is shown in the drawing is to be used with a different light source which does not have a foot 19, the different light source can be mounted on a bracket (not shown) which has a foot or blade corresponding to the foot 19 and being insertable into the path defined by the guide rails 18. Such bracket and its foot or blade are then considered as forming part of the different light source.

The operation:

When the camera is used to make exposures in daylight, the foot 19 of the light source 20 is withdrawn from the space between the guide rails 18 and the spring 14 is free to contract and to move the member 11 to its predetermined position in which the member 11 is arrested by the stop 13. During such upward movement, the member 11 slides along a guide pin 25 which is provided in the housing 1 and prevents excessive counterclockwise pivoting of the member 11 under the action of the spring 14. While the member 11 moves upwardly, the spring 7 pivots the carrier 8 for the filter 5 in a clockwise direction and returns the filter 5 into registry with the lens 2. Such pivoting of the carrier 8 is permitted by the projection or arm 10 which rises with the member 11 and is permanently tracked by the follower pin 9 on the lower arm of the carrier.

If the user thereupon decides to make one or more exposures with artificial illumination of the subject, the foot 19 of the light source 20 is inserted into and moves downwardly along the elongated path defined by the guide rails 18. The front end face 21 of the foot 19 depresses the follower 17 so that the member 11 sides along the stop 13 and stresses the spring 14. The projection 10 pivots the carrier 8 by way of the follower pin 9 and against the opposition of the spring 7 so that the filter 5 is moved to the illustrated position in which it does not register with the lens 2. The foot 19 can be fixed in the illustrated operative position by the screw 24. The camera is then ready to make one or more exposures with artificial illumination of the subject. The opening 15a in the upper end portion 15 of the member 11 is located at a level below the socket 16 so that the terminal or terminals in this socket are not accessible.

Should the user thereupon decide to make one or more exposures in daylight without removing the light source 20, i.e., without withdrawing the foot 19 from the illustrated operative position, the overriding knob 22 is grasped and actuated to pivot the member 11 in a clockwise direction so that the follower 17 slides off the end face 21. Such actuation of the overriding knob 22 enables the spring 14 to dissipate energy and to propel the member 11 upwardly whereby the tip of the follower 17 slides along the vertical guide face 23 of the foot 19. The upward movement of the member 11 to an additional position which is close to its predetermined or starting position is terminated by the stop 13 at the time when the filter 5 registers with the lens 2 because the carrier 8 is free to pivot in a clockwise direction under the action of the spring 7 when the member 11 rises under the action of the spring 14. The opening 15a then exposes the socket 16 so that, if desired, the user can attach to the camera a light source for the making of individual exposures with artificial illumination of the subject in daylight.

The overriding knob 22 can also serve to return the member 11 to the illustrated additional position (through a series of further additional positions). This necessitates the application of a force which overcomes the action of springs 7 and 14 by moving the member 11 downwardly through the intermediary of the overriding knob 22 and by thereupon pivoting the member 11 in a counterclockwise direction so that the follower 17 returns into engagement with the front end face 21 of the properly inserted foot 19.

If the user wishes to remove the source 20 while the follower 17 bears against the guide face 23, the screw 24 is loosened and foot 19 is withdrawn from the path defined by the guide rails 18. The spring 14 is then free to pivot the member 11 so that the latter returns to its predetermined or starting position in which it abuts against the pin 25 in the housing 1. This does not bring about any appreciable change in the position of the filter 5 because the small anticlockwise pivotal movement of the member 11 brings about a negligible change in the position of the projection 10. If desired, the lower edge face of the projection 10 (which is tracked by the follower pin 9) can be of convex, concave or any other suitable shape to insure that the filter 5 remains in registry with the lens 2 when the member 11 pivots during withdrawal of the foot 19 so that the follower 17 first bears against the guide face 23 and is thereupon free to move in a direction to the left, as viewed in the drawing. The follower 17 is then again located in the path of the foot 19 and causes the member 11 to reassume the illustrated additional position in response to insertion of the foot 19 to the operative position. Such movement of the foot 19 to the illustrated operative position results in a movement of the filter 5 to the position out of registry with the lens 2.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a motion picture camera for use in daylight and with artificial illumination of the subject, particularly in a camera for use with 8-millimeter film, a combination comprising a housing; picture taking lens means mounted in said housing; conversion filter means mounted in said housing for movement between a first position of registry and a second position out of registry with said lens means; a source of artificial light having a portion movable with reference to said housing to and from an operative position; motion transmitting means arranged to move said filter means from one of said positions to the other of said positions in response to movement of said portion of said source to said operative position; overriding means actuatable to effect the movement of said filter means from said other position to said one position and from such one position back to said other position in the operative position of said portion of said source; electric terminal means arranged in said housing; and blocking means actuated by said portion of said source during movement thereof for permitting access to said electric terminal means when said portion of said source is out of said operative position and for preventing access to said electric terminal means when said portion of said source is in said operative position.

2. A combination as defined in claim 1, wherein said overriding means is arranged to effect the movements of said filter means by way of said motion transmitting means.

3. A combination as defined in claim 2, wherein said motion transmitting means comprises means for automatically returning said filter means to said one position in response to movement of said portion of said source from said operative position.

4. A combination as defined in claim 1, wherein said portion of said source is movable to said operative position along a predetermined path and said motion transmitting means comprises a motion transmitting member movably mounted in said housing and having follower means extending into said path so that said member is compelled to change its position in response to movement of said portion of said source to said operative position, said motion transmitting means further comprising means for moving said filter means from said one position to said other position in response to such change in the position of said member.

5. A combination as defined in claim 4, wherein said motion transmitting means further comprises means for biasing said member into the path of said portion of said source.

6. A combination as defined in claim 5, wherein said overriding means comprises a device for disengaging said follower means from and for reengaging said follower means with said portion of said source in the operative position of such portion.

7. A combination as defined in claim 6, wherein said path is elongated and said portion of said source comprises a guide face extending in substantial parallelism with said path, said biasing means being arranged to urge said member against said guide face when said portion assumes said predetermined position and said overriding means has been actuated to remove said follower means from said path.

8. A combination as defined in claim 7, wherein said motion transmitting means further comprises stop means for limiting the extent of movement of said member under the action of said biasing means so that said member automatically assumes a position corresponding to said one position of said filter means when said member is biased against said guide face upon actuation of said overriding means to remove said follower means from said path.

9. A combination as defined in claim 6, wherein said biasing means invariably maintains said member in a predetermined position corresponding to said one position of said filter means when said portion of said source is moved from said operative position, said member being movable by said portion of said source to a first additional position corresponding to said other position of said filter means and said member being movable by said overriding means to a plurality of second additional positions one of which corresponds to said one position of said filter means.

10. A combination as defined in claim 5, wherein said path is elongated and said biasing means is arranged to exert upon said member a first force acting in the longitudinal direction of said path and a second force which is at least substantially normal to the longitudinal direction of said path.

11. A combination as defined in claim 1, wherein said motion transmitting means comprises a motion transmitting member which is movable by said portion of said source and by said overriding means, a carrier movably mounted in said housing and supporting said filter means, and follower means provided on said carrier and arranged to track said member.

12. A combination as defined in claim 11, wherein said overriding means comprises a manually operable element located without said housing and rigid with said member.

13. In a motion picture camera for use in daylight and with artificial illumination of the subject, particularly in a camera for use with 8-millimeter film, a combination comprising a housing; picture taking lens means mounted in said housing; conversion filter means mounted in said housing for movement between a first position of registry and a second position out of registry with said lens means; a source of artificial light having a portion movable with reference to said housing to and from an operative position; motion transmitting means arranged to move said filter means from one of said positions to the other of said positions in response to movement of said portion of said source to said operative position; electric terminal means arranged in said housing; and blocking means actuated by said portion of said source during movement thereof for permitting access to said electric terminal means when said portion of said source is out of said operative position and for preventing access to said electric terminal means when said portion of said source is in said operative position.

* * * * *